US010698393B2

(12) United States Patent
Ferry et al.

(10) Patent No.: US 10,698,393 B2
(45) Date of Patent: Jun. 30, 2020

(54) METHOD OF MANUFACTURING PARTS BASED ON ANALYSIS OF STATISTICAL INDICATORS IN A SITUATION OF DIMINISHED CONTROL

(71) Applicant: Safran Aircraft Engines, Paris (FR)

(72) Inventors: Olivier Ferry, Moissy-Cramayel (FR); Arnaud Cambefort, Moissy-Cramayel (FR); Pascal Courtin, Moissy-Cramayel (FR); Nicolas Hardouin, Moissy-Cramayel (FR); Charles Cleret De Langavant, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 10 days.

(21) Appl. No.: 15/532,473

(22) PCT Filed: Dec. 4, 2015

(86) PCT No.: PCT/FR2015/053334
§ 371 (c)(1),
(2) Date: Jun. 1, 2017

(87) PCT Pub. No.: WO2016/087802
PCT Pub. Date: Jun. 9, 2016

(65) Prior Publication Data
US 2017/0329317 A1 Nov. 16, 2017

(30) Foreign Application Priority Data
Dec. 5, 2014 (FR) .................................... 14 62000

(51) Int. Cl.
*G05B 19/048* (2006.01)
*G05B 19/418* (2006.01)

(52) U.S. Cl.
CPC ..... *G05B 19/41875* (2013.01); *G05B 19/048* (2013.01); *G05B 2219/32191* (2013.01); *Y02P 90/22* (2015.11)

(58) Field of Classification Search
None
See application file for complete search history.

(56) References Cited

U.S. PATENT DOCUMENTS 5,257,206 A * 10/1993 Hanson ................ F25J 3/04303
700/273
5,479,340 A * 12/1995 Fox ....................... B24B 37/013
257/E21.528

(Continued)

OTHER PUBLICATIONS

French Search Report, dated Jun. 10, 2015, French Application No. FR1462000.

(Continued)

*Primary Examiner* — Robert A Cassity
*Assistant Examiner* — Gary Collins
(74) *Attorney, Agent, or Firm* — Womble Bond Dickinson (US) LLP

(57) ABSTRACT

The invention pertains to a method of manufacturing a population of parts produced with a manufacturing device, based on the analysis of at least one statistical indicator representative of a characteristic dimension of the parts, according to which: a) a sample comprising a number n of parts is collected from among the parts produced with the manufacturing device; b) the characteristic dimension of each part of the sample is measured, and a measured value of the statistical indicator is calculated for the sample; c) a mathematical expectation of the proportion of parts which are noncompliant with respect to a specification regarding the characteristic dimension is calculated, said calculation being performed on the basis of the measured value of the statistical indicator for the sample collected and of the (Continued)

number n of parts of the sample; d) the mathematical expectation of the proportion of parts that are noncompliant calculated is compared with a threshold value of proportion of noncompliant parts; e) the manufacture of the parts is steered as a function of the results of the comparison of step d).

8 Claims, 7 Drawing Sheets

(56) References Cited

U.S. PATENT DOCUMENTS

| | | | | |
|---|---|---|---|---|
| 5,526,293 | A | * | 6/1996 | Mozumder .......... G05B 13/042 700/109 |
| 5,655,110 | A | | 8/1997 | Krivokapic et al. |
| 5,822,208 | A | * | 10/1998 | Bory ...................... G01N 21/88 700/108 |
| 7,072,899 | B2 | * | 7/2006 | Lokken ................ G06F 11/3452 |
| 7,974,801 | B2 | * | 7/2011 | Good ............... G05B 19/41875 700/109 |
| 2010/0191361 | A1 | * | 7/2010 | McCready ........... G05B 13/048 700/104 |

OTHER PUBLICATIONS

International Search Report with English Language Translation, dated Feb. 2, 2016, Application No. PCT/FR2015/053334.

* cited by examiner

METHOD OF MANUFACTURING PARTS BASED ON ANALYSIS OF STATISTICAL INDICATORS IN A SITUATION OF DIMINISHED CONTROL

FIELD OF THE INVENTION

The invention relates to the use of statistical indicators in an industrial setting, for example, in the aeronautics industry, in particular for facilitating monitoring and control of the manufacturing of parts.

PRIOR ART

The manufacture of parts, especially mechanical parts, in an industrial setting, is met with two opposing constraints: specifically, the increase in manufacturing throughput and volumes on the one hand, and the increased quality requisites on the other, which is particularly true in the aeronautical field.

Today it is difficult to imagine performing quality control on all parts manufactured except to considerably impair manufacturing throughput. Statistical manufacturing indicators are therefore generally used, reliably deducing overall information on the quality of the set of parts manufactured from specific information on the quality of a finite number of parts taken as samples.

Apart from controls at the end of production, which can be done on samples having a limited number of parts, checks are generally also made during production to be able to optionally regulate production flow, that is, adjust manufacturing conditions to ensure that the parts made continue to respond to the required quality criteria. In some cases, these statistical controls during production can result in production stopping completely, especially if the parts produced present excessive quality defects and the manufacturing flow must be completely reinitialised.

Quality controls are performed in relation to a characteristic dimension of parts, which are manufactured. This characteristic dimension can be, for example, a particular side of the part, its mass, or any other measurable characteristic of said parts.

To perform statistical controls, several samples are taken successively, each sample comprising several parts of the manufacturing flow, and the characteristic dimension of each part of the sample taken are then measured. The value of a statistical indicator selected previously to monitor the quality of the manufacturing flow is calculated from the different measurements of the characteristic dimension of the parts of the sample taken.

There are various statistical indicators, which can be used to monitor the evolution of a manufacturing flow of parts, each statistical indicator giving different information for adjusting the manufacturing conditions in one way or another.

Most statistical indicators used for monitoring an industrial manufacturing method are calculated from an average $\mu$ and a standard deviation $\sigma$ of the measured characteristic dimension on several parts. More precisely, $\mu$ corresponds to the average of the decentring measured for the characteristic dimension relative to the reference value for this characteristic dimension.

The manufacturing method can also be regulated by studying capability indices, which characterise the real performance of the method relative to the preferred performance. Such indices, in fact, measure the capacity of the manufacturing method to make parts whereof the characteristic dimensions are included in the preferred tolerance interval IT. The tolerance interval IT is the deviation between the extreme admissible values of the characteristic dimension, therefore being calculated as the difference between the greater tolerance TS and the lesser tolerance TI of the measured characteristic dimension, or IT=TS−TI.

Reference can be made, for example, to the process capability index Cpk, which represents the dispersion but also centring of production relative to the limit of tolerance. In this case, when the capability index Cpk is high, this means that production is repeatable and that it is also centred in the tolerance interval IT, that is, there will be less risk of parts being manufactured outside tolerances. The capability index Cpk is defined generally by the formula:

$$Cpk = \frac{\text{Min}(TS - \mu; \mu - TI)}{3\sigma}$$

The principal interest of the Cpk is that when production distribution follows a normal law, the value of the Cpk of the population produced is directly linked to the proportion of non-conformities produced. More precisely, when the capability index measured for all of a given production is equal to a value $\widetilde{Cpk}$, the proportion (expressed in parts per million, noted ppm) of parts produced with a value greater than TS or less than TI for the characteristic dimension, that is, the proportion of parts in non-conformity, is a maximum:

$$P_{ppm} = 10^6[1 - \text{STANDARD.NORMAL.DISTRIBUTION}(3*\widetilde{Cpk}) + \text{STANDARD.NORMAL.DISTRIBUTION}(-3*\widetilde{Cpk})]$$

For example, a capability index Cpk equal to 1 corresponds to around 2700 ppm of parts in non-conformity, while a capability index Cpk equal to 1.33 corresponds to around 66 ppm of parts in non-conformity.

As indicated earlier, since controls are costly and without value added to the part, only part of the overall production is controlled in general. To achieve this, a sample of n parts is taken, the characteristic dimension on these n parts is measured, and on these n measured values a capability index Cpk is calculated, which is hoped to be representative of that of the entire population produced. Of course, the larger the number of parts sampled n, the higher the degree of confidence in this representativity.

To quantify this confidence, there are approached formulas giving as a function of the number of parts n measured of the capability index Cpk measured, noted $\widetilde{Cpk}$, the limits of the confidence interval on this measurement of capability index at a given threshold of confidence $\alpha$.

The most commonly used is the Kushler formula, which calculates the lower limits of the confidence interval on the capability index Cpk unless a unilateral risk $\alpha$ ($\alpha \in [0; 1]$).

According to this formula, given a capability index measured on n parts, noted $\widetilde{Cpk}$, there is the risk that the capability index Cpk of the real population is less than $$\widetilde{Cpk}\left[1 + z_\alpha \sqrt{\frac{1}{9n\widetilde{Cpk}^2} + \frac{1}{2(n-1)}}\right],$$

where $z_\alpha$ represents the $\alpha^{th}$ percentile of the reduced centred normal law.

For example, there is a 5% chance that the real capability index Cpk of the population is less than $$\widetilde{Cpk}\left[1 - 1.645\sqrt{\frac{1}{9n\widetilde{Cpk}^2} + \frac{1}{2(n-1)}}\right].$$

In practice, the calculated value of the lower limit of the unilateral confidence interval at 5% on the measured capability index is generally compared to the value of the minimum acceptable capability index, noted $Cpk_{mini}$, specified by the designer or the company quality procedures.

In these conditions, given the measurement of a capability index noted $\widetilde{Cpk}$ on a sample of n parts, the level of quality of production is deemed satisfactory, with respect to uncertainties weighing on the representativity of the sample taken on condition that:

$$\widetilde{Cpk}\left[1 - 1.645\sqrt{\frac{1}{9n\widetilde{Cpk}^2} + \frac{1}{2(n-1)}}\right] > Cpk_{mini}.$$

This control mode provides a clear and simple framework on the way to proceed for taking into account the uncertainties linked to sampling in the final sanction (acceptable or not acceptable), which will be rendered on completion of analysis of measurements taken, and will allow or not the pursuit of control reduction, while participating in regulating the production tool.

By way of restriction (replacement of the value $\widetilde{Cpk}$ by the lower limit of the unilateral confidence interval at 5% on this measurement $$\widetilde{Cpk}\left[1 - 1.645\sqrt{\frac{1}{9n\widetilde{Cpk}^2} + \frac{1}{2(n-1)}}\right])$$

for each analysis protection is taken against a risk of 5% that the sample taken seems acceptable while real production could be not acceptable. In other terms, protection is taken against a risk of non-representativity of a sample, which would provide a more optimistic image of the production than the effective reality of parts delivered without having been measured.

The problem with this mode of operation is that it results in imposing heavy restrictions. For example, when the minimal value of the capability index $Cpk_{mini}$ is 1 (which means that 2700 ppm of parts in non-conformity are tolerated) and the aim is to have a reduction to 50 parts per period (which still represents many controls), the value of the capability index measured $\widetilde{Cpk}$, as per this mode of operation will be deemed acceptable on condition that $$\widetilde{Cpk}\left[1 - 1.645\sqrt{\frac{1}{9n\widetilde{Cpk}^2} + \frac{1}{2(n-1)}}\right] > 1,$$

is $\widetilde{Cpk} > 1.22$, which corresponds to 252 ppm of parts in non-conformity. Thus whereas the specification tolerates 2700 ppm of parts in non-conformity, it should produce continually at a rate of non-conformity ten times less to be able to remain permanently reducible at a rate however relatively high of 50 parts per period.

An aim of the present invention is therefore to provide a method for manufacturing parts based on analysis of at least one statistical indicator, which rectifies the above drawbacks.

More specifically, an aim of the present invention is to provide a method for manufacturing parts based on analysis of at least one statistical indicator, which enables reliable and more precise reduction of control.

Yet another aim of the present invention is to provide a method for manufacturing parts based on analysis of at least one statistical indicator with a reduced restriction, and ensuring control reduction at least also reliable.

SUMMARY OF THE INVENTION

For this purpose, we propose a method for manufacturing a population of parts based on analysis of at least one statistical indicator representative of a characteristic dimension of parts, according to which:
a) A sample comprising a number n of parts is taken by parts produced with a manufacturing device;
b) The characteristic dimension of each part of the sample is measured, and a measured value of the statistical indicator is calculated for the sample;
c) A mathematical expectation of the proportion of parts in non-conformity is calculated relative to a specification on the characteristic dimension, said calculation being made from the measured value of the statistical indicator for the sample taken and the number n of parts of the sample;
d) the mathematical expectation of the calculated proportion of parts in non-conformity is compared to a threshold value of proportion of parts in non-conformity;
e) The production of parts is regulated as a function of the results of comparison of step d).

Each of the steps presented is preferably conducted automatedly.

The measuring step of the characteristic dimension can be taken with a measuring device, comprising, for example, sensors for taking an automated measurement of specific dimensions of the part.

The calculation steps can be taken by any appropriate calculation device, such as, for example, data-processing means, such as a computer.

The regulating step can, for example, be conducted by a regulating device integrating processing means for integrating and processing data originating from the calculation steps, to correct any deviation detected in production and correct the production flow. In particular, the regulating device is provided to correct the input parameters of the production device from which the parts originate.

The regulating device will therefore preferably adjust the regulating parameters of the manufacturing device used for making the parts, for example, to reduce the deviation between the value of the statistical indicator and a reference value.

More generally, the aim is to optimise the deviation between the value of the statistical indicator and the reference value so that production of parts complies with the requirements of the associated specification. The production parameters are modified to modify, or respectively correct, the deviation identified between the value of the statistical indicator and the reference value. As a function of the statistical indicator used, optimising the deviation could, for example, consist of reducing the deviation identified.

Preferred but non-limiting aspects of this method, taken singly or in combination, are the following:
- at step c), a confidence interval on the statistical indicator is calculated also unless a unilateral risk α, where α is between 0 and 1, said calculation being made from the measured value of the statistical indicator for the sample taken and the number n of parts of the sample; and at step d), the lower limit of the calculated confidence interval is compared also to a threshold value of the statistical indicator corresponding to the threshold value of proportion of parts in non-conformity.
- at step e):
  - If the lower limit of the calculated confidence interval is greater than the threshold value of the statistical indicator, no modification is made to the manufacturing flow of parts;
  - If the lower limit of the calculated confidence interval is less than the threshold value of the statistical indicator and the mathematical expectation of the proportion of parts in non-conformity calculated for the sample is greater than the threshold value of proportion of parts in non-conformity, corrective actions are taken on the manufacturing flow of parts, for example, by adjusting regulating parameters of the manufacturing device, and/or increasing the number of parts sampled during later sampling of a sample;
  - If the mathematical expectation of the proportion of parts in non-conformity calculated for the sample is less than the threshold value of proportion of parts in non-conformity, the manufacturing flow of parts is discontinued.
- the at least one statistical indicator is a capability index Cpk defined by the formula:

$$Cpk = \frac{\text{Min}(TS - \mu; \mu - TI)}{3\sigma}$$

where:
- $\mu$ is the average of the characteristic dimensions measured on the parts of the sample taken;
- $\sigma$ is the standard deviation of the characteristic dimensions measured on the parts of the sample taken;
- TS is an upper tolerance of the characteristic dimension measured;
- TI is a lower tolerance of the characteristic dimension measured.

at step c), it is assumed that the population of the parts follows a normal law, and the following calculations are made:

c1) Calculation of the function of inverse distribution $G_{ppm}$ of the proportion of parts in non-conformity at risk of being accepted knowing only the measured value $\widetilde{Cpk}$, of the capability index on the characteristic dimension for the sample of n parts, according to the formula:

$$G_{ppm} = 10^6 \left[1 - \text{STANDARD.NORMAL.DISTRIBUTION}\right.$$

$$\left(3 * \widetilde{Cpk}\left[1 + z_\alpha \sqrt{\frac{1}{9n\widetilde{Cpk}^2} + \frac{1}{2(n-1)}}\right]\right) +$$

STANDARD.NORMAL.DISTRIBUTION $$\left.\left(-3 * \widetilde{Cpk}\left[1 + z_\alpha \sqrt{\frac{1}{9n\widetilde{Cpk}^2} + \frac{1}{2(n-1)}}\right]\right)\right]$$

Where $\alpha \in [0; 1]$ and $z_\alpha$ represents the $\alpha^{th}$ percentile of the standard normal law;

c2) Calculation of the mathematical expectation of the proportion of parts in non-conformity by taking the integral between 0 and 1 of the function of inverse distribution $G_{ppm}$ according to α.

at step c), it is assumed that the population of the parts follows a normal law, and the mathematical expectation of the proportion of parts in non-conformity is determined from calculation of the density of probability of the proportion of parts in non-conformity, where:
  It is considered that the risk of having $X_0$ ppm of parts in non-conformity if the overall population corresponds to a capability index given by the formula:

$$Cpk_0 = \frac{1}{3} \text{INVERSE.STANDARD.NORMAL.DISTRIBUTION}\left(1 - \frac{X_0}{2.10^6}\right)$$

the density of probability of the proportion of parts in non-conformity is determined based on a percentile p of the calculated confidence interval from the measured value $\widetilde{Cpk}$, of the capability index on the characteristic dimension for the sample of n parts according to the formula:

$$p = \text{STANDARD.NORMAL.DISTRIBUTION}\left(\frac{Cpk_0 - \widetilde{Cpk}}{\sqrt{\frac{1}{9n\widetilde{Cpk}^2} + \frac{1}{2(n-1)}}}\right)$$

at step c), it is assumed that the population of the parts follows a normal law, and the following calculations are made:

c1) Simulation of a plurality of drawings of real population from an average $\mu$ and a standard deviation $\sigma$ of the characteristic dimension measured on the sample of n parts assuming that the random variable $$\sqrt{n}\left(\frac{\hat{\mu} - \mu}{\hat{\sigma}}\right)$$

follows a Student law at n−1 degrees of liberty, and that the random variable $$(n-1)\frac{\hat{\sigma}^2}{\sigma^2}$$

is distributed as per a law of $\chi^2$ at n−1 degrees of liberty, where $\mu$ and $\sigma$ are respectively the real average and the real standard deviation of the characteristic dimension for the population; then c2) Calculation of the proportion of parts in non-conformity for each simulated drawing, and calculation of the average of the proportion of parts in non-conformity on all of the simulated drawings to deduce therefrom the mathematical expectation of the proportion of parts in non-conformity.

the manufacturing flow of parts corresponds to a batch having a determined number of parts $N_0$, where:

At step a), the number of parts n sampled to form the sample is less than the number $N_0$ of parts of the batch;

At step c), an average of the proportion of parts in non-conformity in the batch is calculated also by weighting the number of parts of the sample measured in conformity by the value 0, by weighting the number of parts of the sample measured in non-conformity by the value of the calculated mathematical expectation, and by weighting the number of parts of the non-sampled batch in the sample by the value of the calculated mathematical expectation;

At step d), the average of the proportion of parts in non-conformity in the batch is compared to the threshold value of proportion of parts in non-conformity;

At step e), the batch of parts produced as a function of the results of comparison of step d) is accepted or refused.

DESCRIPTION OF FIGURES

Other characteristics and advantages of the invention will emerge from the following description, which is purely illustrative and non-limiting and must be viewed in conjunction with the attached diagrams, in which.

DETAILED DESCRIPTION OF THE INVENTION

Figure 1:
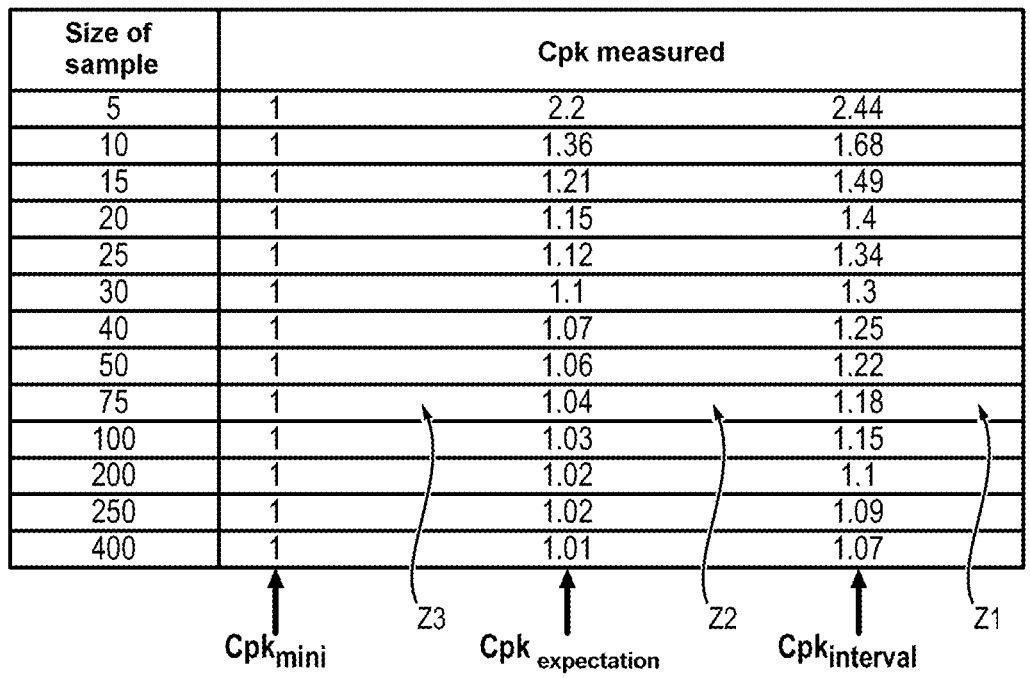
FIG. 1 is a table presenting the threshold values in terms of capability index Cpk as a function of the size of the sample, for a minimum specification of capability index equal to 1.

The principle of the invention is based on the fact that this is not because a sample does not strictly respect the restricted statistical criterion required for a characteristic dimension, that all of the population could not on average verify the specification having to produce a proportion of parts in non-conformity less than a certain imposed threshold.

Continuing with the earlier example of the prior art where, with samples of 50 parts, it is suggested having a measured capability index greater than 1.22 to be certain that all of the population of parts satisfies the requirement of a minimum capability index equal to 1. Simulations, of Monte-Carlo drawing type, for example, of real populations likely to have been produced when the measurement of a sample of 50 parts gives a measured capability index of a value of 1.06 (that is, far less than the minimal value of 1.22 tolerated by the prior art) show that the repeated acceptance of populations having a measured capability index of 1.06 on 50 parts verifies on average, that is, over long periods, the specification supposed to produce fewer than 2700 ppm of parts in non-conformity. At times the proportion of parts in non-conformity if the delivered population is greater than 2700, but these situations are compensated by periods during which the proportion of non-conformities is low. According to this example, with respect to the specification tolerating 2700 ppm of non-conformities it is not dangerous to repeatedly accept batches of parts on the basis of measuring a capability index greater than or equal to 1.06 on samples of 50 parts, since any non-conformities will be compensated on average. In this way, the value for the measured capability index of 1.22, which was a reference in the prior art can consequently be lowered to 1.06 (when the minimal criterion of the capability index without control reduction is equal to 1), which represents a major quantitative leap.

It is proposed therefore to monitor production of parts based on a calculation of expectation of the proportion of parts in non-conformity. This expectation of the proportion of parts in non-conformity is then compared to a threshold of acceptable parts in non-conformity for regulating production as a consequence.

In this way, monitoring a manufacturing flow of a population of parts based on analysis of at least one statistical indicator representative of a characteristic dimension of parts can occur according to the following successive steps:

a) A sample comprising a number n of parts is taken in the manufacturing flow of parts;

b) The characteristic dimension of each part of the sample is measured and a measured value of the statistical indicator is calculated for the sample;

c) A mathematical expectation of the proportion of parts in non-conformity is calculated relative to a specification on the characteristic dimension, said calculation being made from the measured value of the statistical indicator for the sample taken and the number n of parts of the sample;

d) The mathematical expectation of the proportion of parts in non-conformity calculated is compared to a threshold value of proportion of parts in non-conformity;

e) The manufacturing flow of parts is regulated as a function of the results of comparison of step d).

The mathematical expectation of a real random variable corresponds to the value expected to be found, on average, if the same random experience is repeated many times. It corresponds to a weighted average of values this variable can assume.

Provision can also be made to monitor production by having two comparative values for refining regulating of the production flow. As in the prior art, the first value can correspond to the lower limit of the confidence interval on the statistical indicator unless a unilateral risk α, which if respected ensures that current production is compliant. The second value corresponds as proposed to the mathematical expectation of the proportion of parts in non-conformity calculated, which acts more finely on the regulating of production.

In this way, in the monitoring method of production, at step c), a confidence interval on the statistical indicator can also be calculated unless a unilateral risk α, where a is between 0 and 1, said calculation being done from the measured value of the statistical indicator for the sample taken and the number n of parts of the sample. In this case at step d) the lower limit of the calculated confidence interval is compared also to a threshold value of the statistical indicator corresponding to the threshold value of proportion of parts in non-conformity.

Regulating of production according to this embodiment could be the following:
- If the lower limit of the calculated confidence interval is greater than the threshold value of the statistical indicator, no modification is made to the manufacturing flow of parts (regulating mode 1);
- If the lower limit of the calculated confidence interval is less than the threshold value of the statistical indicator and if the mathematical expectation of the proportion of parts in non-conformity calculated for the sample is greater than the threshold value of proportion of parts in non-conformity, corrective actions are taken on the manufacturing flow of parts and/or the number of parts sampled during later sampling of a sample is increased (regulating mode 2);
- If the mathematical expectation of the proportion of parts in non-conformity calculated for the sample is less than the threshold value of proportion of parts in non-conformity, the manufacturing flow of parts is discontinued (regulating mode 3).

As for intervals of confidence, the value of the mathematical expectation of the proportion of parts in non-conformity depends on the number of parts controlled: the higher this number the lower the uncertainty linked to the representativity of the sampling, and therefore the less necessary it will be to restrict the minimal value of the statistical indicator to be proved on the sample.

The rest of the description is made in reference to the capability index Cpk as statistical indicator used in the monitoring of production of the flow of parts, but the basic idea of the invention is not limited to this statistical indicator and could be adapted to other statistical indicators used in conventionally in monitoring of industrial production.

The table of FIG. 1 presents the threshold values in terms of capability index Cpk (this table could also be presented as a function of the threshold proportions of parts in non-conformity), the value $Cpk_{interval}$ being the threshold value of capability index according to the confidence interval at 5% and the value $Cpk_{expectation}$ being the threshold value of capability index according to the mathematical expectation of the proportion of parts in non-conformity. The minimal value of capability index $Cpk_{mini}$ for all of the population is fixed here at 1.

The table in FIG. 1 shows that the threshold values evolve as a function of the number of parts n in the sample.

Figure 2:
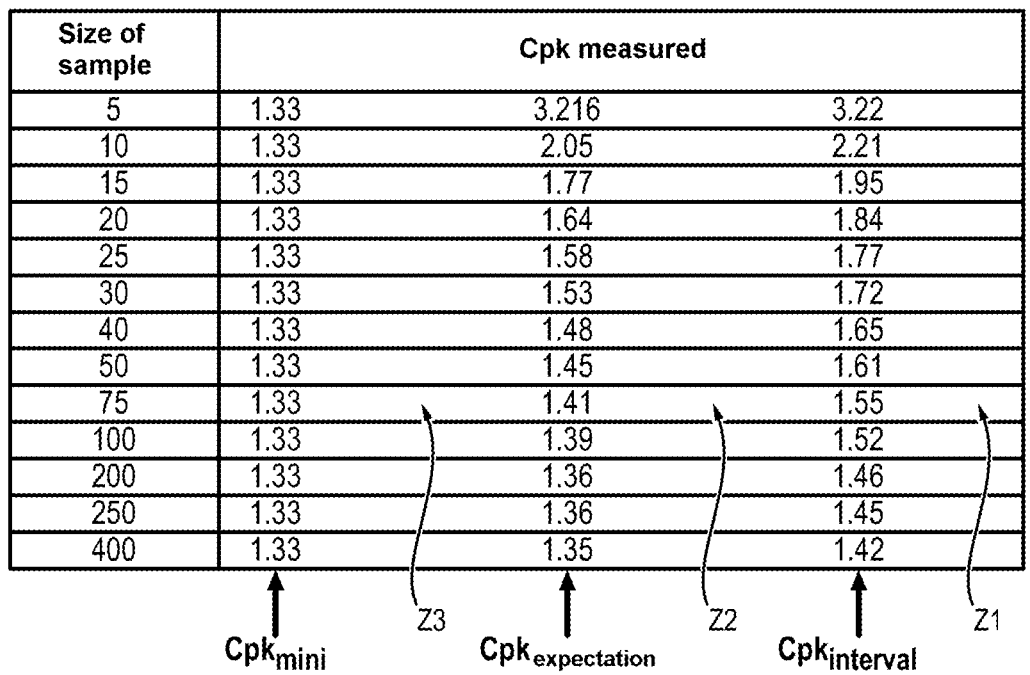
FIG. 2 is a table presenting the threshold values in terms of capability index Cpk as a function of the size of the sample, for a minimum specification of capability index equal to 1.33.

The table of FIG. 2 is similar to the table of FIG. 1 but presents threshold values corresponding to a minimal value of capability index $Cpk_{mini}$ for all of the population is fixed here at 1.33.

The tables of FIGS. 1 and 2 also show different zones for regulating the production flow as described hereinabove. In this way, the zones Z1, Z2, and Z3 correspond, for example, respectively to the regulating mode 1, regulating mode 2, and regulating mode 3.

These restrictions can also be represented in the form of a graphic illustrating, as a function of the number of parts measured, the minimal value of capability index to be proved to be in zone 1 or zone 2.

Figure 3:
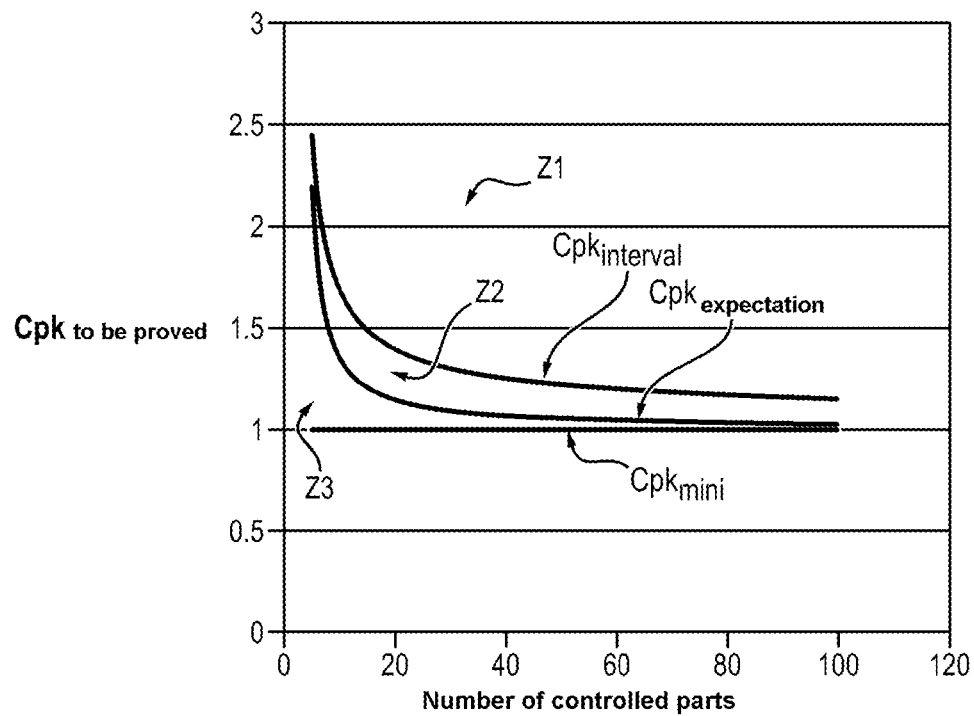
FIG. 3 is a graphic illustrating the evolution of threshold values in terms of capability index Cpk as a function of the size of the sample, for a minimum specification of capability index equal to 1.

The graphic of FIG. 3 corresponds to such a representation for a specification of overall capability index $Cpk_{mini}$=1.

Figure 4:
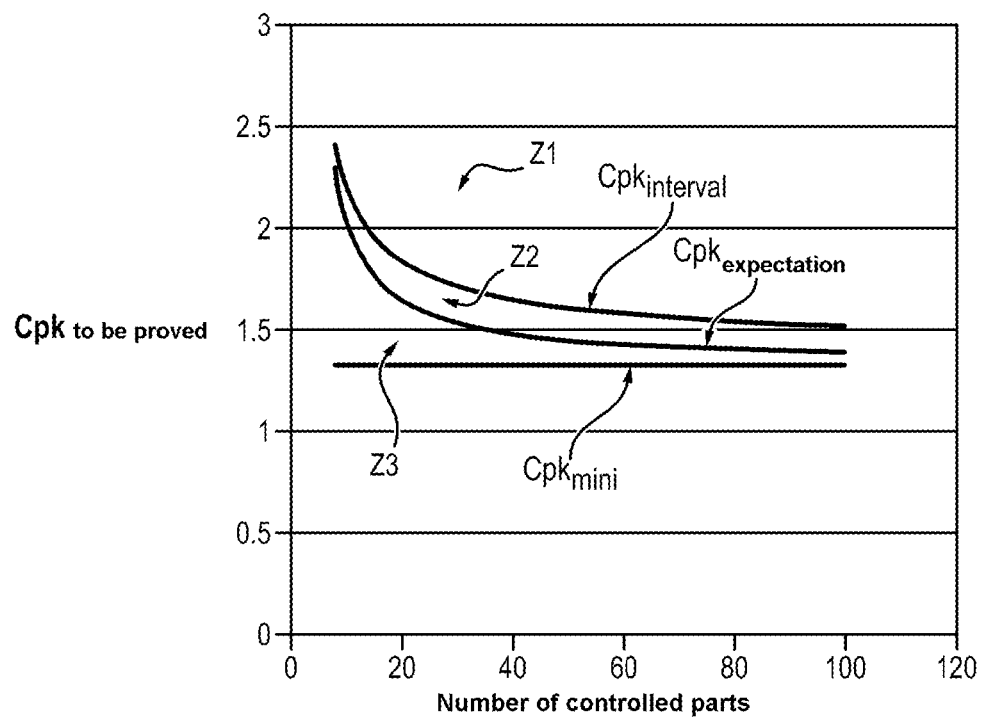
FIG. 4 is a graphic illustrating the evolution of threshold values in terms of capability index Cpk as a function of the size of the sample, for a minimum specification of capability index equal to 1.33.

The graphic of FIG. 4 corresponds to such a representation for a specification of overall capability index $Cpk_{mini}$=1.33.

According to the method proposed, a calculation is therefore made to determine the mathematical expectation of the proportion of parts in non-conformity potentially created by a situation in which a given capability index was measured on a sample containing a given number of parts.

For a given sampling characterised by a number of parts n sampled in the sample and a calculated capability index, the aim is therefore to quantify, in number of parts created in non-conformity (in ppm), the expectation of the risk taken when the entire population is accepted. The challenge is to set up an intermediate sanction (corresponding to the regulating mode 2, for example) when the expectation of the risk created will be less than the proportion of parts in non-conformity tolerated by the specification.

There are several possibilities for calculating this mathematical expectation. Three different methods will be described below, which can be executed independently of each other, or in parallel if the aim is to have an averaged estimation of the mathematical expectation.

Density of probability means the function for quantifying the probability of making a drawing in a given range of values. The higher value this function has in a considered range of data, the more the drawn values will be densely distributed in the data range in question after many drawings. This will be noted as f hereinbelow in this summary.

Distribution function means the function associating with each possible result value the probability of carrying out a drawing less than this value. This will be noted hereinbelow as F. It is equal to the primitive of f, which is cancelled at −∞, and is calculated consequently as follows: $F(x_0)=\int_{-\infty}^{x_0} f(t)dt$.

Finally, inverse of the distribution function (or function of inverse distribution) means the function linking with each probability p the smallest drawing value $X_0$ such that the probability of drawing a value less than $X_0$ is equal to p. This will be noted as G. It is defined by the relationship: $G(t)=\inf\{x \in R:F(x) \geq t\}$.

For a random variable U of uniform law on [0; 1] and F a given distribution function, it is known that the random variable G(U) has F for distribution function.

As a result, if X follows a law of probability characterised by a density of probability $f_X$, a distribution function $F_X$ and a function of inverse distribution $G_X$, this gives the equality: $Expectation(X)=\int_0^1 G_X(t)dt$.

The first calculation method proposed is based on the calculation function of inverse distribution $G_{ppm}$ of the proportion of parts in non-conformity risking being accepted when only the measured value $\widetilde{Cpk}$, of the capability index on the characteristic dimension for the sample of n parts is known.

This method will be described on a particular example which can easily be generalised at any sample size and any capability index. According to this example, a value $\widetilde{Cpk}$, of the capability index equal to 1.51 was measured on 50 parts. The overall population of the parts of the production flow is supposed to be normal. The maximal proportion of authorised non-conformities is fixed at 66 ppm (Cpk=1.33).

Assuming normality of the population, it is known to convert a capability index Cpk into a proportion of parts in non-conformity created in the detrimental assumption of a centred law:

$$P_{ppm} = 10^6[1-\text{STANDARD.NORMAL.DISTRIBUTION}(3*Cpk)+\text{STANDARD.NORMAL.DISTRIBUTION}(-3*Cpk)]$$

and reciprocally:

$$Cpk = \frac{1}{3}\text{INVERSE.STANDARD.NORMAL.DISTRIBUTION}\left(1 - \frac{P_{ppm}}{2.10^6}\right)$$

The Kushler formula calculates the lower limits of the confidence interval on the capability index Cpk unless a unilateral risk $\alpha$ ($\alpha \in [0; 1]$). Given a capability index $\widetilde{Cpk}$, measured on n parts, there is the risk $\alpha$ that the capability index Cpk of the real population is less than $$\widetilde{Cpk}\left[1 + z_\alpha \sqrt{\frac{1}{9n\widetilde{Cpk}^2} + \frac{1}{2(n-1)}}\right],$$

where $z_\alpha$ represents the $\alpha^{th}$ percentile of the standard normal law.

For example, there is a 5% chance that the real capability index Cpk of the population is less than $$\widetilde{Cpk}\left[1 - 1.645 \sqrt{\frac{1}{9n\widetilde{Cpk}^2} + \frac{1}{2(n-1)}}\right].$$

From this it follows that the function of inverse distribution of the proportion of parts in non-conformity is tolerated, which risks being accepted when the delivery of a batch of which only one capability index $\widetilde{Cpk}$, measured on n parts is known, is the function, which associates:

$$G_{ppm} = 10^6\Bigg[1 - \text{STANDARD.NORMAL.DISTRIBUTION}\left(3*\widetilde{Cpk}\left[1 + z_\alpha \sqrt{\frac{1}{9n\widetilde{Cpk}^2} + \frac{1}{2(n-1)}}\right]\right) + \text{STANDARD.NORMAL.DISTRIBUTION}\left(-3*\widetilde{Cpk}\left[1 + z_\alpha \sqrt{\frac{1}{9n\widetilde{Cpk}^2} + \frac{1}{2(n-1)}}\right]\right)\Bigg]$$

with $\alpha \in [0; 1]$.

Figure 5:
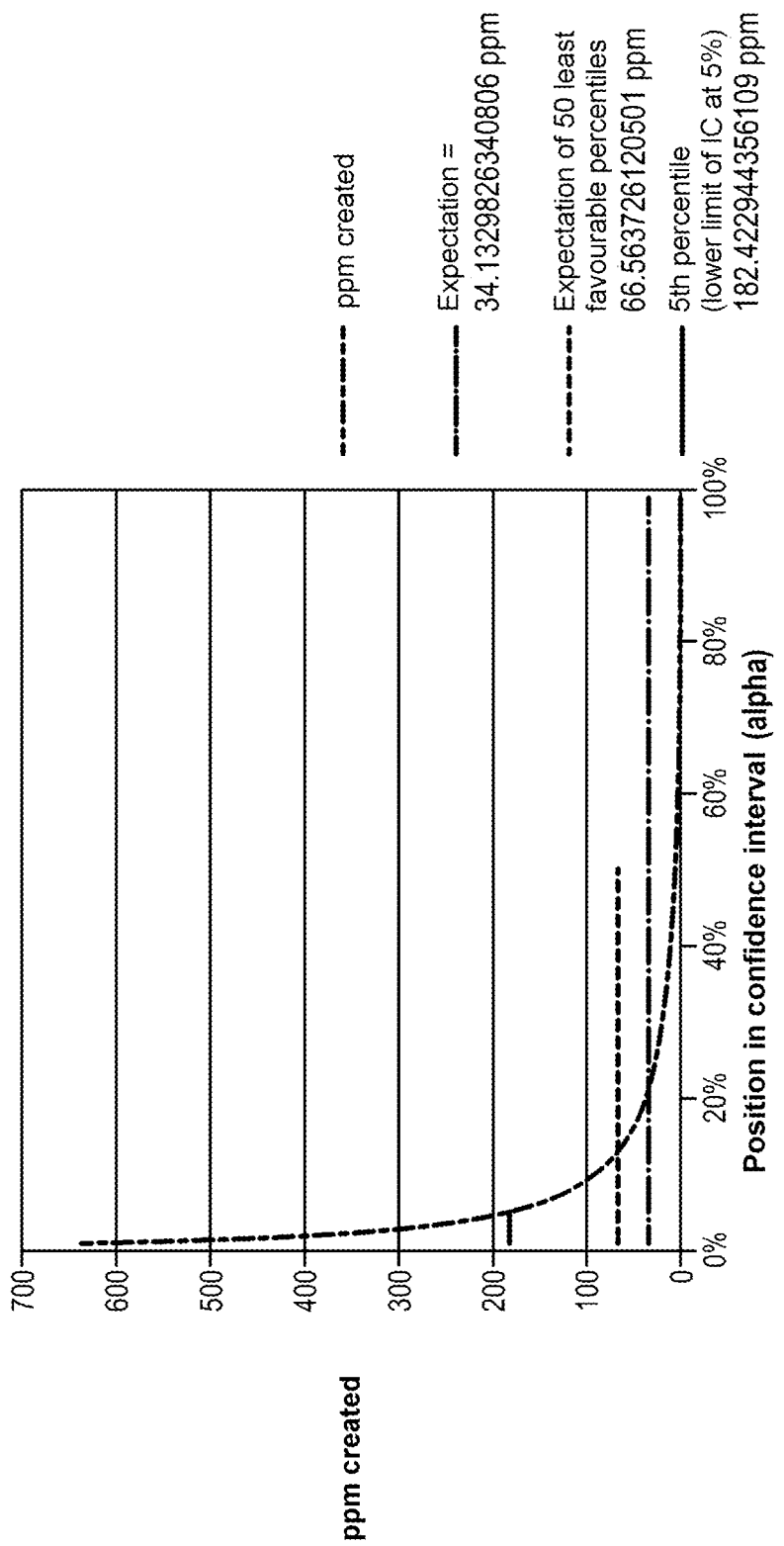
FIG. 5 is a graphic illustrating the function of inverse distribution of the proportion of parts in non-conformity for a measured capability index of 1.51 on a sample of 50 parts.

In the case of the example where $\widetilde{Cpk}=1.51$ and n=50, this function of inverse distribution can be represented graphically, as illustrated in FIG. 5.

In keeping with the corollary presented hereinabove, the planned expectation is calculated as being equal to the value of the integral between 0 and 1 of the function of inverse distribution of the random variable.

For the particular example, the calculated mathematical expectation according to this first method is around 34 ppm.

The second proposed calculation method is based on calculation of the density of probability of the proportion of parts in non-conformity.

From the Kushler formula it is also possible to represent the allure of the density of probability of the studied random variable by performing inverse reasoning to that developed for the first method.

A risk of having $X_0$ ppm of parts in non-conformity if the overall population corresponds to $$Cpk_0 = \frac{1}{3}\text{INVERSE.STANDARD.NORMAL.DISTRIBUTION}\left(1 - \frac{X_0}{2.10^6}\right).$$

The percentile of the corresponding normal law in the Kushler formula is:

$$z_0 = \frac{Cpk_0 - \overline{Cpk}}{\sqrt{\frac{1}{9n\widetilde{Cpk}^2} + \frac{1}{2(n-1)}}}.$$

It follows that this is now in the percentile of the confidence interval p=STANDARD.NORMAL.DISTRIBUTION($z_0$); and it is then possible from many calculations of different values for p to differentiate p relative to the number of ppm created to obtain the preferred value of the density of probability.

Figure 6:
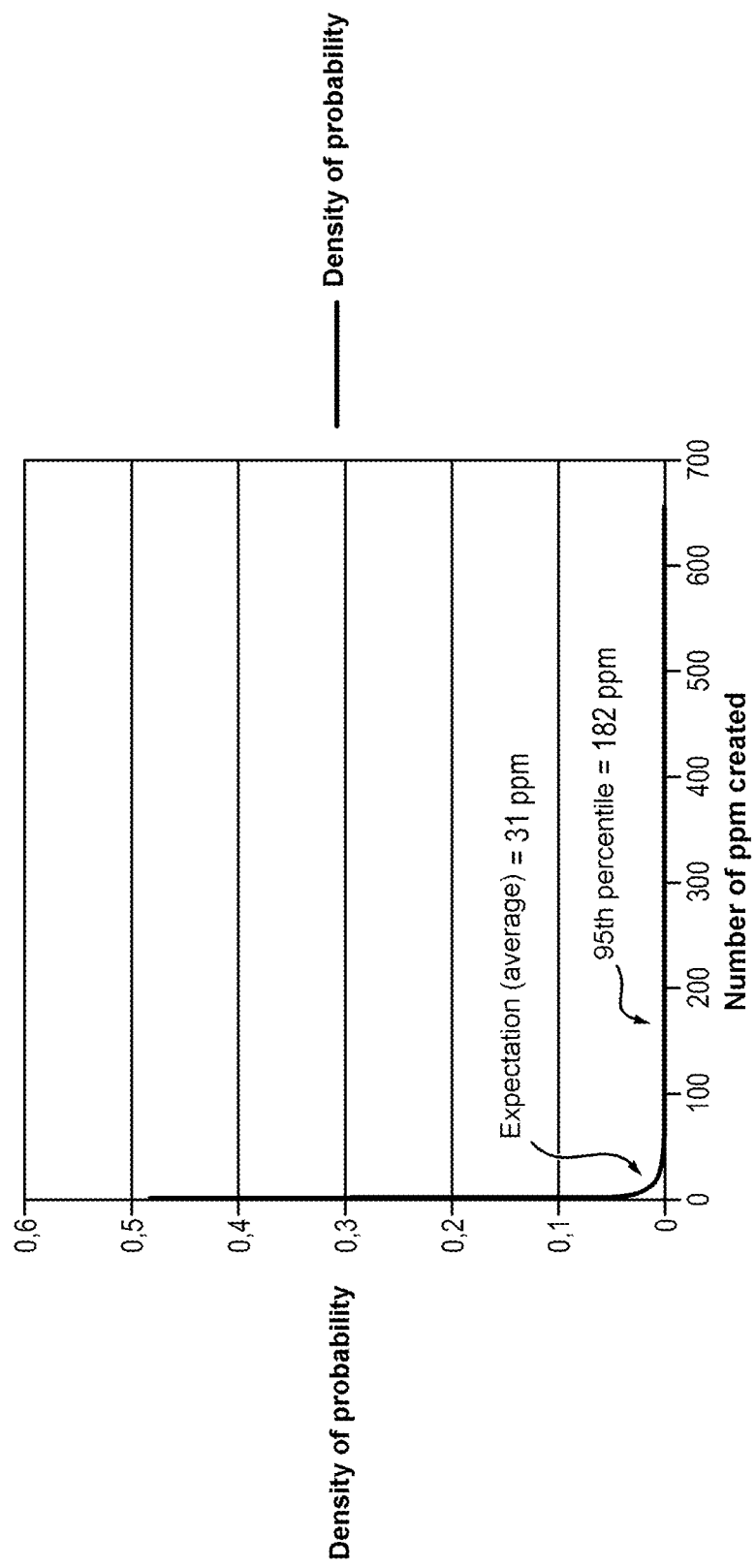
FIG. 6 is a graphic illustrating the density of probability of the proportion of parts in non-conformity for a measured capability index of 1.51 on a sample of 50 parts.

In the case of the example where $\widetilde{Cpk}$, =1.51 and n=50, this density of probability can be represented graphically, as illustrated in FIG. 6.

For the particular example, the calculated mathematical expectation according to this second method is around 31 ppm.

The difference of 3 ppm observed between the two methods is to be attributed to the imprecisions of integration and the fact that only a finished range of ppm as created was taken into account in the second method, combining only little more than 99% of all the densities of probability (which means that the area below the curve of FIG. 6, in the field on which it is traced, is equal to 0.9904 only).

By way of illustration, and for easier comprehension of the phenomenon, the density of probability of the random variable can also be represented in the case $\widetilde{Cpk}$, =1.1 and n=50. This representation is illustrated graphically in FIG. 7.

In this precise case, if the specification tolerates 2700 ppm of parts in non-conformity, this population would have been rejected in the prior art, as the 95$^{th}$ percentile is 6843 ppm, well beyond the maximum tolerated. It is clear that the expectation remains despite being less than 2700 ppm (besides, the median and the mode are lower still)

The third calculation method proposed is no longer based on the Kushler formula, but on random drawings.

Measuring a given average $\tilde{\mu}$ and a standard deviation $\tilde{\sigma}$ is considered on a sample of 50 parts originating from a supposedly normal population.

Noting respectively $\mu$ and $\sigma$ the real average and the real standard deviation of the overall population, the random variable $$\sqrt{n}\left(\frac{\tilde{\mu}-\mu}{\tilde{\sigma}}\right)$$

follows a Student law à n−1 degrees of liberty, and the random variable $$(n-1)\frac{\tilde{\sigma}^2}{\sigma^2}$$

is distributed per a law of the $\chi^2$ à n−1 degrees of liberty.

In this way, several drawings of real population can be simulated merely from knowing that there is the sample.

Figure 8:
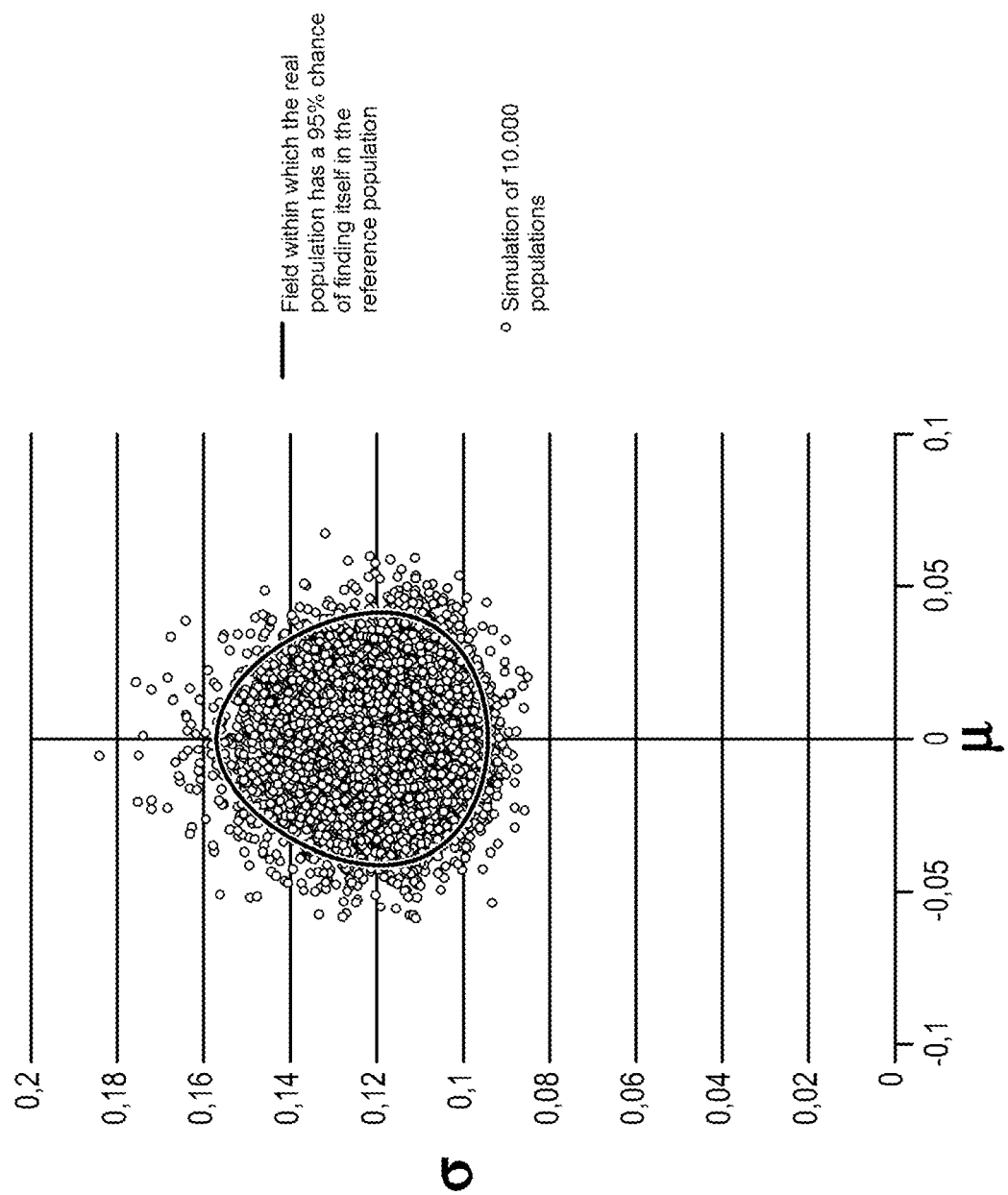
FIG. 8 is a graphic representing the simulations of several drawings representing in the plan (µ;σ) the potential positions of the real population.

The graph of FIG. 8 represents these simulations made on 10,000 drawings representing in the plane $\mu$; $\sigma$ the potential positions of the real population. Here the average of the controlled population on 50 parts is 0 and for standard deviation 0.1167, with tolerances at +/−0.53, which represents a Cpk of 1.51.

On each of the thousand real populations drawn the proportion of non-conformities can be calculated, and then the average can be calculated.

Each drawing of 10,000 populations will give a different result, but this average number of the proportion of parts in non-conformity created varies between 37 ppm and 42 ppm.

The difference with the two preceding methods is based on the fact that the Kushler formula on which they are based provides one approximation only, supposedly excellent, of the limits of intervals of confidence on the capability index. In particular, it is clear that the limits given by the Kushler formula are symmetrical, which especially neglects the asymmetry of the distribution of standard deviations, which are more dispersed towards strong values than small values.

The results of calculations of mathematical expectation of the proportion of parts in non-conformity according to these three methods can be synthesised according to the table below:

|  | Raw measurement | Lower limit of confidence interval at 5% on measurement | Expectation of number of ppm created calculated by the first method | Expectation of number of ppm created calculated by second method | Expectation of number of ppm created calculated by third method |
| --- | --- | --- | --- | --- | --- |
| Cpk | 1.51 | 1.25 | N/A | N/A | N/A |
| ppm created | 5.9 | 182 | 31 | 34 | 39 |

Given that according to the example, the target in terms of tolerated parts in non-conformity is fixed at 66 ppm) Cpk=1.33), the study conducted on the sampling of 50 parts, which was given to measure a capability index $\widetilde{Cpk}$, affirms that:

The expectation of the number of parts in non-conformity at risk of being accepted by tolerating the delivery of the population is far greater than what the sole capability index Cpk given by the raw measurement without consideration of the uncertainties was indicating (around 35 ppm against 5.9 ppm for the raw measurement);

If the lower limit of the confidence interval at 5% is taken for reference on the measurement of the capability index Cpk, there is a number of parts in non-conformity created equal to 182 ppm, which is far greater than the specification of 66 ppm. This suggests that the population has a risk greater than 5% of being non-compliant with the specification.

The expectation of the number of parts in non-conformity risked being accepted by tolerating the delivery of the population despite all else is less than what is possible if the lower limit of the confidence interval at 5% is taken for reference on the measurement of the capability index Cpk (around 35 ppm against 182 ppm).

The expectation of the number of parts in non-conformity at risk of being accepted by tolerating the delivery of the population is less than the specification (around 35 ppm as against 66 ppm), which affirms that by repeatedly tolerating the delivery of such populations, the specification would be respected on the overall delivery volume.

For all these reasons it seems reasonable to accept delivery of this batch, though according to an intermediate regulating mode.

In the context of dynamic management of samplings, it could, for example, be requested for the period following the control of a larger number of parts, so as to better characterise the delivered population and decrease any risks (with an increased level of sampling and with constant sampling quality, the values listed in the four last columns of the table above will decrease).

In conclusion, instead of sanctioning a population characterised by sampling solely on the basis of the least favourable calculation of the $95^{th}$ percentile of the confidence interval on the capability index Cpk, henceforth, its entire distribution function is taken into consideration and factored in the calculation of an expectation, making it possible to decide whether or not it is acceptable and, therefore, to regulate the production method.

An additional application of the proposed expectation calculation can also be to allow release of a batch.

Figure 7:
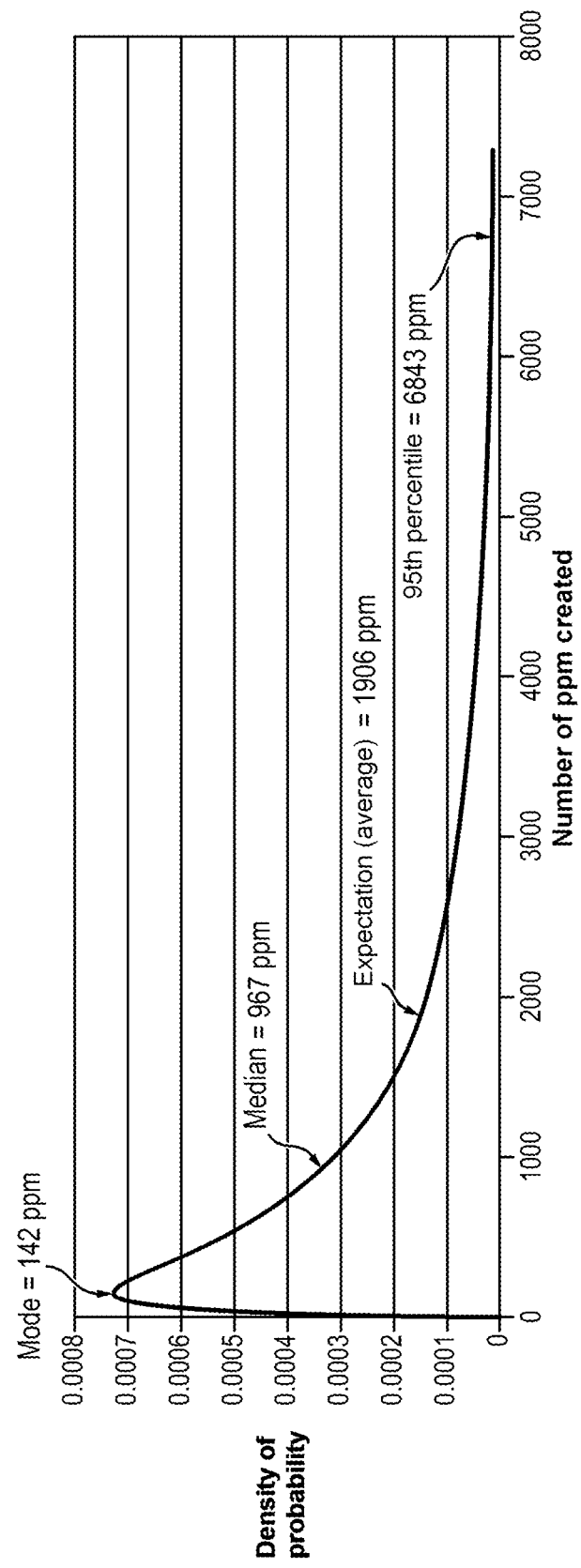
FIG. 7 is a graphic illustrating the density of probability of the proportion of parts in non-conformity for a measured capability index of 1.1 on a sample of 50 parts.

In reviewing the example illustrated by the graphic of FIG. 7, 50 parts were controlled and a Cpk equal to 1.1 was found.

The expectation calculation mentioned earlier shows that the expectation of the proportion of parts in non-conformity from among the non-controlled parts is 1906 ppm.

If the batch contains 75 parts (50 controlled and 25 not controlled) and if no non-conformity from among the controlled parts is detected, the expectation of the total proportion of non-compliant parts in the batch is (50*0+25*1906)/(50+25)=635 ppm.

If the specification requires having fewer than 700 ppm non-conformities from among the parts delivered (corresponding to a capability index Cpk of 1.14), it is deduced that the batch could be released as the risk at issue, expressed in terms of non-conformities produced, is less than that tolerated by the specification.

In this way, this alleger the controls, therefore the Cpk measured (1.1) is less than that specified (1.14). In the prior art this batch would of course have been refused without additional control.

In this way, if a manufacturing flow of parts corresponds to a batch having a determined number of parts $N_0$, the monitoring method as presented can be adapted as follows:

At step a), the number of parts n sampled to form the sample is less than the number $N_0$ of parts of the batch;

At step c), an average of the proportion of parts in non-conformity in the batch is calculated also by weighting the number of parts of the sample measured in conformity by the value 0, by weighting the number of parts of the sample measured in non-conformity by the value of the calculated mathematical expectation, and by weighting the number of parts of the non-sampled batch in the sample by the value of the calculated mathematical expectation;

At step d), the average of the proportion of parts in non-conformity in the batch is compared to the threshold value of proportion of parts in non-conformity;

At step e), the batch of parts produced as a function of the results of comparison of step d) is accepted or refused.

This last example clearly illustrates the power, utility and proven gains for the producer of adequate and precise characterisation of the risks associated with a situation for lessening control, in which uncertainties linked to the fact that only part of the production will have been measured should be taken into account.

The method proposed can be executed in a manufacturing chain of parts, which can be automated totally or partially, where controls during production regulate the manufacturing flow, that is, adjust the manufacturing conditions to ensure that the parts manufactured continue responding to the required quality criteria.

Figure 9:
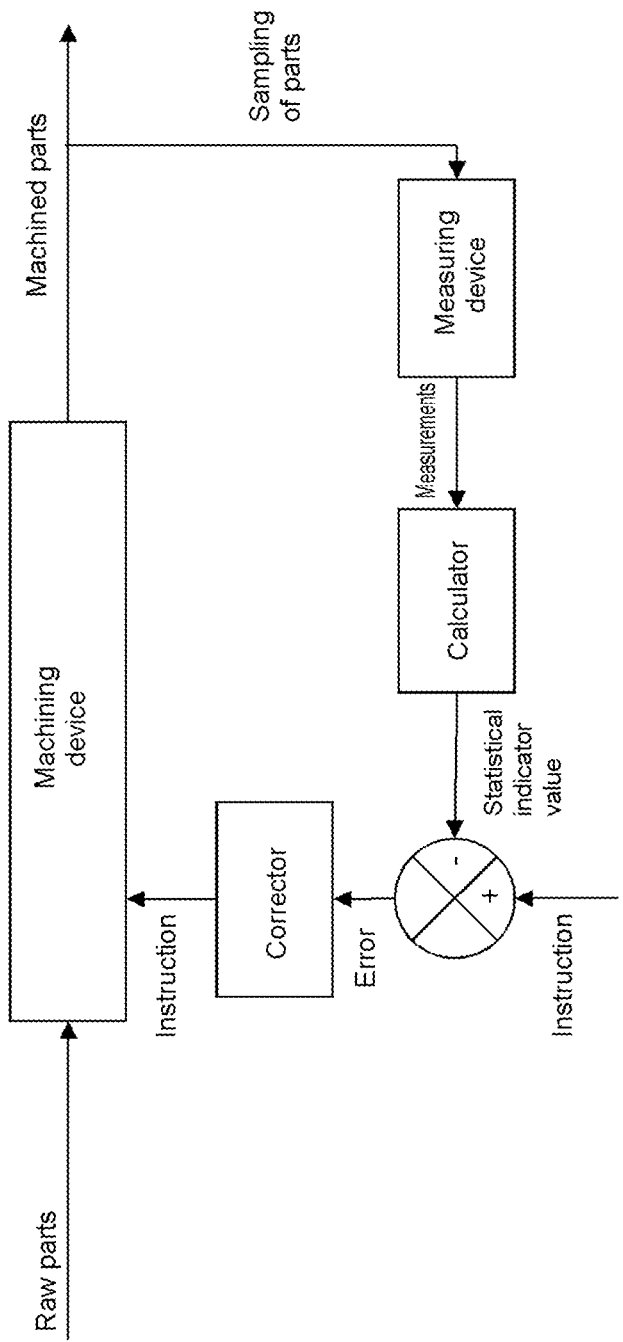
FIG. 9 is a diagram illustrating a production chain integrating control and regulating of the production with sampling of parts.

FIG. 9 gives an example of such a manufacturing chain in which a machining device, such as, for example, a 5-axle machine, is used for making parts according to a specific instruction. The specific instruction can, for example, refer to a particular characteristic dimension. In place of the machining device, a manufacturing device not limited to the machining of parts could of course be used.

In this automated production chain, parts are sampled when exiting the machining device to form a sample and sent to a measuring device, which measures one or more characteristic dimensions of each part of the sample taken. Such a measuring device can, for example, be a three-dimensional measuring machine having sensors, which automatically measure the preferred characteristic dimensions of each of the parts.

The data from measurements coming from the measuring device are then sent to a calculation device, which processes them to calculate one or more statistical indicators representative of one of the characteristic dimensions of the parts.

In the case presented here, the calculation device will also calculate from values of the statistical indicator the mathematical expectation of the proportion of parts in non-conformity relative to the specification on the characteristic dimension.

The value calculated of the mathematical expectation of the proportion of parts in non-conformity is compared to a threshold value of proportion of parts in non-conformity, and the results of this comparison are used for optionally adjusting the input parameters of the machining device. This adjustment of input parameters of the machining device can, for example, be done according to the strategy described above.

The invention claimed is:

1. A method for manufacturing a population of parts produced with a manufacturing device, based on analysis of at least one statistical indicator representative of a characteristic dimension of parts, according to which:
  a) a sample comprising a number n of parts is taken from among the parts produced with the manufacturing device;
  b) the characteristic dimension of each part of the sample is measured, and a measured value of the statistical indicator is calculated for the sample;
  c) a mathematical expectation of a proportion of parts in non-conformity relative to a specification is calculated on the characteristic dimension, said calculation being made from the measured value of the statistical indicator for the sample taken and the number n of parts of the sample;
  d) the mathematical expectation of the proportion of parts in non-conformity calculated is compared to a threshold value of proportion of parts in non-conformity;
  e) as a function of the results of comparison of said step d), a manufacturing parameter of the manufacturing device is adjusted if the mathematical expectation of the proportion of parts in non-conformity calculated is greater than the threshold value of proportion of parts in non-conformity, the manufacturing parameter being selected to correct a deviation of the characteristic dimension of parts relative to the specification.

2. The method as claimed in claim 1, in which:
at step c), a confidence interval on the statistical indicator is calculated taking into account a unilateral risk $\alpha$, where $\alpha$ is between 0 and 1, said calculation being made from the measured value of the statistical indicator for the sample taken and the number n of parts of the sample;
at step d), the lower limit of the calculated confidence interval is compared to a threshold value of the statistical indicator corresponding to the threshold value of proportion of parts in non-conformity.

3. The method as claimed in claim 2, in which at step e):
if the lower limit of the calculated confidence interval is greater than the threshold value of the statistical indicator, no modification is made to the manufacturing flow of parts;
if the lower limit of the calculated confidence interval is less than the threshold value of the statistical indicator and the mathematical expectation of the proportion of parts in non-conformity calculated for the sample is greater than the threshold value of proportion of parts in non-conformity, the manufacturing parameter of the manufacturing device is adjusted and/or the number of parts sampled during later sampling of a sample is increased;
if the mathematical expectation of the proportion of parts in non-conformity calculated for the sample is less than the threshold value of proportion of parts in non-conformity, the manufacturing flow of parts is discontinued.

4. The method as claimed in claim 1, in which the at least one statistical indicator is a capability index Cpk defined by the formula:

$$Cpk = \frac{\text{Min}(TS - \mu; \mu - TI)}{3\sigma}$$

where:

$\mu$ is the average of the characteristic dimensions measured on the parts of the sample taken;

σ is the standard deviation of the characteristic dimensions measured on the parts of the sample taken;

TS is an upper tolerance of the characteristic dimension measured;

TI is a low tolerance of the characteristic dimension measured.

5. The method as claimed in claim 4, in which at step c), it is assumed that the population of the parts follows a normal law, and the following calculations are made:

c1) calculation of the function of inverse distribution $G_{ppm}$ of the proportion of parts in non-conformity which risk being accepted by knowing only the measured value $\widetilde{Cpk}$ of the capability index on the characteristic dimension for the sample of n parts, according to the formula:

$$G_{ppm} = 10^6 \left[ 1 - \text{STANDARD.NORMAL.DISTRIBUTION}\left(3*\widetilde{Cpk}\left[1+z_\alpha\sqrt{\frac{1}{9n\widetilde{Cpk}^2}+\frac{1}{2(n-1)}}\right]\right) + \text{STANDARD.NORMAL.DISTRIBUTION}\left(-3*\widetilde{Cpk}\left[1+z_\alpha\sqrt{\frac{1}{9n\widetilde{Cpk}^2}+\frac{1}{2(n-1)}}\right]\right) \right]$$

where $\alpha \in [0; 1]$ and $z_\alpha$ represents the $\alpha^{th}$ percentile of the standard normal law;

c2) calculation of the mathematical expectation of the proportion of parts in non-conformity by taking the integral between 0 and 1 of the function of inverse distribution $G_{ppm}$ according to α.

6. The method as claimed in claim 4, in which at step c) it is assumed that the population of parts follows a normal law, and the mathematical expectation of the proportion of parts in non-conformity is determined from calculation of the density of probability of the proportion of parts in non-conformity, where:

it is considered that the risk of having $X_0$ ppm of parts in non-conformity in the overall population corresponds to an indication of capability given by the formula:

$$Cpk_0 = \frac{1}{3} \text{INVERSE.STANDARD.NORMAL.DISTRIBUTION}\left(1 - \frac{X_0}{2.10^6}\right)$$

the density of probability of the proportion of parts in non-conformity is determined based on a percentile p of the calculated confidence interval from the measured value $\widetilde{Cpk}$ of the capability index on the characteristic dimension for the sample of n parts according to the formula:

$$p = \text{STANDARD.NORMAL.DISTRIBUTION}\left(\frac{Cpk_0 - \widetilde{Cpk}}{\sqrt{\frac{1}{9n\widetilde{Cpk}^2}+\frac{1}{2(n-1)}}}\right).$$

7. The method as claimed in claim 4, in which at step c) it is assumed that the population of the parts follows a normal law, and the following calculations are made:

c1) simulation of a plurality of drawings of real population from an average μ and a standard deviation σ of the characteristic dimension measured on the sample of n parts assuming that the random variable $$\sqrt{n}\left(\frac{\hat{\mu}-\mu}{\hat{\sigma}}\right)$$

follows a Student law at n–1 degrees of liberty, and the random variable $$(n-1)\frac{\hat{\sigma}^2}{\sigma^2}$$

is distributed as per a law of the $\chi^2$ at n–1 degrees of liberty, where μ and σ are respectively the real average and the real standard deviation of the characteristic dimension for the population; then c2) calculation of the proportion of parts in non-conformity for each simulated drawing, and calculation of the average of the proportion of parts in non-conformity on all of the simulated drawings to deduce therefrom the mathematical expectation of the proportion of parts in non-conformity.

8. A method for manufacturing a population of parts produced with a manufacturing device, based on analysis of at least one statistical indicator representative of a characteristic dimension of parts, the population of parts being a batch having a determined number of parts $N_0$, wherein according to the method:

a) a sample comprising a number n of parts is taken from among the parts produced with the manufacturing device, with the number of parts n being less than the number $N_0$ of parts of the batch;

b) the characteristic dimension of each part of the sample is measured, and a measured value of the statistical indicator is calculated for the sample;

c) a mathematical expectation of a proportion of parts in non-conformity relative to a specification is calculated on the characteristic dimension, said calculation being made from the measured value of the statistical indicator for the sample taken and the number n of parts of the sample, and an average of the proportion of parts in non-conformity in the batch is further calculated by weighting the number of parts of the sample measured in conformity by the value 0, by weighting the number of parts of the sample measured in non-conformity by the value of the calculated mathematical expectation, and by weighting the number of parts of the non-sampled batch in the sample by the value of the calculated mathematical expectation;

d) the calculated mathematical expectation of the proportion of parts in non-conformity is compared to a threshold value of proportion of parts in non-conformity, and the calculated average of the proportion of parts in non-conformity in the batch is compared to the threshold value of proportion of parts in non-conformity;

e) as a function of the results of comparison of said step d), a manufacturing parameter of the manufacturing device is adjusted if the calculated mathematical expectation of the proportion of part in non-conformity calculated is greater than the threshold value of proportion of parts in non-conformity, the manufacturing parameter selected to correct a deviation of the characteristic dimension of parts relative to the specification.

\* \* \* \* \*